United States Patent
Sato

(10) Patent No.: US 7,407,705 B2
(45) Date of Patent: Aug. 5, 2008

(54) MAGNETIC POWDER, A MAGNETIC RECORDING MEDIUM USING THE MAGNETIC POWDER, AND A METHOD OF SURFACE TREATING A MAGNETIC POWDER

(75) Inventor: Kimitaka Sato, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 258 days.

(21) Appl. No.: 10/555,638

(22) PCT Filed: May 7, 2004

(86) PCT No.: PCT/JP2004/006481

§ 371 (c)(1),
(2), (4) Date: Nov. 4, 2005

(87) PCT Pub. No.: WO2004/100189

PCT Pub. Date: Nov. 18, 2004

(65) Prior Publication Data

US 2006/0118206 A1     Jun. 8, 2006

(30) Foreign Application Priority Data

May 8, 2003    (JP) ............................. 2003-129766

(51) Int. Cl.
*B32B 5/16*     (2006.01)

(52) U.S. Cl. .................... 428/402; 428/405; 428/842.1; 428/842.2; 428/842.3

(58) Field of Classification Search ................. 428/402, 428/403, 405, 842.1, 842.2, 842.3
See application file for complete search history.

(56) References Cited

U.S. PATENT DOCUMENTS 6,531,211 B1 * 3/2003 Hayashi et al. ............. 428/323

FOREIGN PATENT DOCUMENTS

| JP | 6-163234 | 6/1994 |
|---|---|---|
| JP | 7-94310 | 4/1995 |
| JP | 7-272254 | 10/1995 |
| JP | 8-209110 | 8/1996 |
| JP | 10-340805 | 12/1998 |
| JP | 2001-15318 | 1/2001 |
| JP | 2001-262119 | 9/2001 |
| JP | 2001-357501 | 12/2001 |

* cited by examiner

*Primary Examiner*—H. T Le
(74) *Attorney, Agent, or Firm*—Clark & Brody

(57) ABSTRACT

A magnetic powder composed primarily of Fe that has been surface-treated with a silane coupling agent, which magnetic powder is characterized in that it contains Co such that Co/Fe expressed in atomic percent is 20-50 at. %, Al such that Al/Fe expressed in atomic percent is 5-30 at. %, and one or more rare earth elements R (including Y) such that R/Fe expressed in atomic percent is 4-20 at. %, and has average particle diameter of smaller than 80 nm, TAP density of 0.7 g/cm$^3$ or greater, ignition point of 165° C. or higher, and oxygen content of 26 wt % or less.

16 Claims, No Drawings

MAGNETIC POWDER, A MAGNETIC RECORDING MEDIUM USING THE MAGNETIC POWDER, AND A METHOD OF SURFACE TREATING A MAGNETIC POWDER

TECHNICAL FIELD

This invention relates to a magnetic powder suitable for forming a magnetic layer of a coating-type magnetic recording medium such as a magnetic tape or magnetic disk.

BACKGROUND ART

Magnetic recording media are today desired to have not only enhanced recording capacity but also improved reliability and durability. An intense effort is therefore underway to boost the recording capacity of next-generation magnetic recording media by using short wavelength signals to realize high recording density. The achievement of this goal will require a magnetic powder consisting of fine particles and exhibiting excellent properties. Unless the particle size is much smaller than the length of the region for recording the short-wavelength side signal, a distinct magnetic transition state cannot be produced, making practical recording impossible. The particle size of the magnetic powder is therefore required to be sufficiently small.

To realize higher density, the resolution of the recording signal must be increased. Reduction of magnetic recording medium noise is therefore important. Noise is usually attributable to particle size. The finer the particles are, the lower the noise becomes. This also makes it necessary for a magnetic powder used for high density recording to have sufficiently small particle size.

Moreover, a magnetic powder used in a magnetic recording medium enabling high density recording requires high coercive force (Hc) in order to maintain magnetism in the high-density medium and ensure the output. In addition, switching field distribution (SFD) must be made as narrow as possible because low SFD is essential for realizing high-density recording.

As the particle size of a magnetic powder becomes finer, dispersion during coating material preparation at the time of tape making becomes more difficult for a number of reasons, including that the specific surface area increases, interparticle sintering occurs and interparticle aggregation arises. Good dispersion is therefore required even when the particles are fine. In light of these circumstances, a magnetic powder for a magnetic recording medium is required from the functional aspect to simultaneously exhibit ultra-fine particle size, high coercive force, low SFD and excellent dispersibility.

On the other hand, the importance of avoiding damage to stored data increases with increasing storage capacity of the magnetic recording medium. A tape or the like for data storage is therefore required to have enhanced reliability. A tape with improved storage stability is therefore desired. In other words, it is important for the particulate magnetic powder itself to have excellent weatherability and oxidation resistance enabling it to be stored stably unaffected by the ambient environment.

A magnetic powder suitable for a high-density magnetic recording medium is therefore required to simultaneously meet the requirements not only of ultra-fine particle size, high Hc, low SFD and excellent dispersibility but also of good weatherability and oxidation resistance. However, no magnetic powder simultaneously and fully meeting these requirements has yet emerged.

Progress in the particle refinement of a magnetic powder is accompanied by the problem of a very large rise in particle surface activity. In the case of a metallic magnetic powder, the practice is to oxidize the surface of a magnetic powder obtained by reduction by some method so as to impart oxide stabilization by putting it in a condition formed with an oxide coating. Various surface oxidizing methods are available, including the method of gradual oxidation of the surface under an appropriate temperature in the presence of an oxygen-containing gas and the method of emersion in toluene or the like followed by dry-oxidation in air, but in all such methods, surface oxidation with respect to ultra-fine particles degrades the acicularity of internal metallic portions, markedly lowers Hc and causes SFD deterioration.

With such a technique that performs surface oxidation, the oxidation resistance of the obtained magnetic powder improves with increasing oxidation, i.e., with increasing thickness of the surface oxide film, but on the other hand, the acicularity of the internal metallic core portion markedly deteriorates, so that the coercive force (Hc) of the magnetic powder, which depends on the magnetic shape anisotropy, markedly decreases and the SFD exhibits degradation. In addition, the volume of the metallic portion inside the particles declines in proportion as the surface oxidation of fine-particle metallic magnetic powder advances. With fine particles, a certain degree of decrease in volume causes a marked decline in magnetic properties owing to thermal fluctuation, and a further degrease causes lack of magnetism owing to superparamagnetism.

Also owing to these circumstances, an attempt to enhance oxidation resistance by means of strengthening the surface oxidation lowers Hc, degrades SFD and promotes superparamagnetism, so that the magnetic properties become unsuitable as those of metallic magnetic particles used in a high recording density magnetic recording medium. Further, this problem exists not only in metallic magnetic powders but also in iron carbide, iron nitride and the like in which a metastable phase is present, so that it is difficult solely by forming a surface oxide coating to provide sufficient weatherability and oxidation resistance while simultaneously realizing the needed magnetic properties.

Patent References 1 and 2 teach technologies for using a silane coupling agent to improve the weatherability of a metallic magnetic powder and improve the dispersibility of a metallic magnetic powder in resin.

| Patent Reference 1 | JP-Hei-7-272254 A |
|---|---|
| Patent Reference 2 | JP-Hei-7-94310 A |

PROBLEMS TO BE OVERCOME BY THE INVENTION

From the aforesaid Patent References 1 and 2 it can be presumed that if metallic magnetic particles are treated with a silane coupling agent to impart reactants exhibiting compatibility with a resin for forming a magnetic layer on the particle surfaces, the dispersibility in the resin will be improved. It can be further presumed that if polymerization by dehydration is performed after a silane coupling agent has been applied to the particle surfaces, the oxidation resistance of the metallic magnetic powder will be improved because of the formation of a silicone-system coating on the particle surfaces.

However, it is not easy to coat ultra-fine particles of a particle diameter of 100 nm or smaller, or even 80 nm or smaller, uniformly with a silane coupling agent. Such ultra-fine particles are more stable when they partially aggregate to form secondary particles than when monodispersed in the state of primary particles, so that when treated with the silane coupling agent the silane coupling agent does not necessarily uniformly adhere to the individual particle surfaces. Moreover, the surface of metallic magnetic powder composed primarily of Fe may not necessarily exhibit hydrophilicity, in which case there is encountered the problem that the OR group of the silane coupling agent (methoxy group, ethoxy group or other reactant that chemically bonds with an inorganic substance) does not readily react throughout the surface of the metallic magnetic particles. Therefore, even though treatment with a silane coupling agent may be feasible in the case of a relatively large particle size as in Patent References 1 and 2, the same treatment with a silane coupling agent cannot be effectively performed with respect to ultra-fine particles.

The object of the present invention is therefore to provide a magnetic powder of ultra-fine particles that is improved in weatherability and oxidation resistance, has high coercive force and low SFD and is further excellent in compatibility and dispersibility in a coating material, even with respect to a magnetic powder whose particles have been made ultra-fine for high-density magnetic recording.

DISCLOSURE OF THE INVENTION

In order to overcome the foregoing problems, the inventor focused on the action of silane coupling agents and repeatedly tested treatment of magnetic powders of a particle size of 100 nm or less with silane coupling agents, by which it was clarified that insofar as the surface condition of the treated magnetic powder is appropriate and, ideally, the ultra-fine particles are maintained in a monodispersed state in an organic medium, the individual particles can be coated throughout with the silane coupling agent even in the case of such ultra-fine particles, so that, even in the case of ultra-fine particles, there can be obtained a magnetic powder that is excellent in weatherability (atmosphere corrosion resistance) and oxidation resistance and good in dispersibility into a resin, while also having high coercive force and low SFD.

Specifically, the present invention provides a magnetic powder composed primarily of Fe that has been surface-treated with a silane coupling agent, which magnetic powder is characterized in that:

it contains:
Co such that Co/Fe expressed in atomic percent is 20-50 at. %,
Al such that Al/Fe expressed in atomic percent is 5-30 at. %, and
one or more rare earth elements R (including Y) such that R/Fe expressed in atomic percent is 4-20 at. %, and has
average particle diameter of smaller than 80 nm,
TAP density of 0.7 g/cm$^3$ or greater,
ignition point of 165° C. or higher, and
oxygen content of 26 wt % or less.

Further, the present invention provides a magnetic powder composed primarily of Fe, which is a magnetic powder for a coating-type magnetic recording medium that:

has a particle volume (V) calculated from a transmission electron micrograph of not less than 1000 nm$^3$ and not greater than 15000 nm$^3$, contains
Si such that Si/Fe expressed in atomic percent is 0.1-10 at. %, and
C such that C/Fe expressed in atomic percent is 0.5-40 at. %, and has
oxygen content of 26 wt % or less
TAP density of 0.7 g/cm$^3$ or greater,
ignition point of 165° C. or higher,
Δσs (amount of change (%) in saturation magnetization value σs during storage for seven days under constant temperature and humidity at a temperature of 60° C. and relative humidity of 90%) of 20% or less, and
saturation magnetization value σs of less than 140 emu/g, and satisfies
the relation of Formula 1 below between its coercive force and particle volume and, optionally, the relationship of Formula 2 below between its Δσs and particle volume and the relationship of Formula 3 below between its oxygen content and particle volume:

$$Hc \geq 325 \times In(V) - 900 \qquad \text{Formula 1}$$

$$\Delta\sigma s \leq -7.8 \times In(V) + 94, \qquad \text{Formula 2}$$

$$\text{Oxygen content} \leq -4.2 \times In(V) + 55, \qquad \text{Formula 3}$$

where, in Formula 1, Hc represents coercive force (Oe) and V represents particle volume (nm$^3$) calculated from a transmission electron micrograph.

This magnetic powder is preferably composed of acicular iron alloy magnetic particles whose:

specific surface area by BET method is 60 m$^2$/g or greater,
average major axis length is 20-80 nm,
Co content is such that Co/Fe expressed in atomic percent is 20-50 at. %,
Al content is such that Al/Fe expressed in atomic percent is 5-30 at. %, and
rare earth element R content including Y is such that R/Fe expressed in atomic percent is 4-20 at. %.

Such a magnetic powder composed primarily of iron can be obtained by, in the final step of production, reacting the magnetic powder and a silane coupling agent, with the magnetic powder in an organic medium under a nonoxidizing atmosphere and in a state of dispersion up to where the degree of dispersion β according to the formula below becomes 10 or less:

degree of dispersion β=Dfloc (particle average volume in solvent by dynamic light scattering)/DTEM (particle average volume observed by a transmission electron microscope).

The magnetic powder reacted with the silane coupling agent at this time is preferably one composed of particles on whose surfaces is distributed hydrophilic alumina or an oxide of rare earth element(s) including Y.

As indicated in the Examples set forth later, the magnetic powder according to the present invention can form a magnetic layer obtained by dispersion in a resin at an orientation ratio of 2.5 or greater. With this magnetic layer, ΔBm (amount of change (%) in Bm during storage for seven days under constant temperature and humidity at a temperature of 60° C. and relative humidity of 90%) becomes 15% or less and it is possible to satisfy the relationships of Formula 4, Formula 5, Formula 6 and Formula 7 between the particle volume (V) of the magnetic powder and each of ΔBm, Hcx, SFDx and SQx of the magnetic layer:

$$\Delta Bm \leq -3.6 \times In(V) + 40.5 \quad \text{Formula 4}$$

$$Hcx \geq 630 \times In(V) - 3400 \quad \text{Formula 5}$$

$$SFDx \leq 0.2 + 506V^{-0.79} \quad \text{Formula 6}$$

$$SQx \geq 0.065 In(V) + 0.15. \quad \text{Formula 7}$$

PREFERRED EMBODIMENTS OF THE INVENTION

Preferred embodiments of the magnetic powder according to the present invention will now be explained.

Magnetic powders to which the present invention applies can be α—Fe and alloy powders such as Fe—Ni, Fe—Co, Fe—Co—Ni, Fe—Pt and Co—Pt, and, aside from alloys, can also be iron compounds such as iron carbide, iron nitride and iron oxide. The effect of the present invention is particularly pronounced in the case of a magnetic powder of high surface reactivity.

The shape of the magnetic powder particles is not particularly limited and can be any shape, such as acicular (including fusiform i.e. spindle-shaped and flat needle-like i.e. flat acicular), ellipsoid, particulate, spherical or the like, but the effect of the present invention is great when acicular (including spindle-shaped and flat acicular), especially, flat acicular particles are used. The definition of flat acicular is the same as the flat acicular of the magnetic powder taught by JP-Hei-10-340805A and means that in the cross-sectional shape of the particle, the sectional ratio of the maximum minor axis width/minimum minor axis width is greater than 1, preferably greater than 1.3.

Regarding the size of the magnetic powder particles, the particle volume calculated from a transmission electron micrograph is preferably 1000-15000 nm. When the particle volume is too much smaller than 1000 nm3, superparamagnetism owing to thermal fluctuation occurs and dispersion becomes difficult. When larger than 15000 nm$^3$, the particles become inappropriate for a low-noise medium in terms of electromagnetic conversion property. The specific surface area by the BET method is preferably 40 m$^2$/g or greater. When smaller than this, the particles are too large and inappropriate for a low-noise medium in terms of electromagnetic conversion property.

In the case of a ferromagnetic alloy powder composed primarily of iron whose particle shape is acicular, spindle-shaped or flat acicular, it is preferably a ferromagnetic alloy powder of a major axis length of not less than 20 nm and not greater than 100 nm, preferably not less than 20 nm and not greater than 80 nm. For obtaining it, an iron oxyhydrate obtained by an ordinary method is dehydrated at a temperature of 200-600° C., the obtained acicular iron oxide particles are used as a starting material, and this starting material is reduced under heating at 300-700° C. as in the hydrogen gas method. This ferromagnetic iron alloy powder composed primarily of Fe can have a heterogeneous element commonly used for property improvement, such as Al, Si, Co or the like, incorporated within the particles or made present on the particle surfaces. In the case of incorporating Co, a rare earth element or Al, the ranges, expressed as atomic percent based on Fe, are preferably 20-50 at. % as Co/Fe for Co, 5-30 at. % as Al/Fe for Al, and 4-20 at. % as R/Fe for rare earth element (R) including Y. Of particular note is that when Al and R are incorporated within these ranges, alumina and rare earth element oxides are distributed on the particle surfaces to make the particle surfaces hydrophilic throughout. This works advantageously in the silane coupling agent treatment explained later. The oxygen content of the magnetic powder should be not greater than 26 wt % based on the whole particle.

In the case of a magnetic powder composed of iron carbide, iron nitride or the like or these intermixed with an alloy, any material constitution is acceptable, including that in which the iron carbide or iron nitride forms a stable phase or forms a metastable phase. Even a material of a constitution that has been considered unstable heretofore can be modified to a stable state by the silane coupling agent treatment according to the present invention.

The present invention conducts surface treatment on the foregoing magnetic powders using a silane coupling agent. The following two methods are known as methods for surface treatment of a magnetic powder with a silane coupling agent:

1) That of producing a polymerization reaction at the particle surfaces by contacting the magnetic powder and a specific coupling agent in a vapor phase.
2) That of either slurrying the magnetic powder with a dilute solution and adding a specific coupling agent thereto to produce a polymerization reaction at the particle surfaces or adding the magnetic powder to a coupling agent-containing solution to produce a polymerization reaction at the particle surfaces.

The treatment in vapor of 1) is high in productivity but in the case of ultra-fine particle magnetic powder, the coating tends to lack uniformity and density. The treatment in liquid of 2) enables formation of a more uniform and denser coating than 1) but, as pointed out earlier, in the case of ultra-fine particles of a particle diameter of 100 nm or less, particularly of 80 nm or less, tends to form secondary particles in the liquid, so that there is a problem of the silane coupling agent not uniformly coating the individual particle surfaces.

In the present invention, the silane coupling agent treatment in liquid of 2) is conducted with respect to ultra-fine particles magnetic powder, but in order to monodisperse the individual particles in the liquid and surface treat the particle surfaces with silane coupling agent: A) a measure is implemented for dispersing the magnetic powder so that the degree of dispersion β becomes 10 or less and B) a measure is implemented so that the magnetic particles before surface treatment exhibit hydrophilicity throughout their surfaces.

The magnetic particle surface treatment method of the present invention disperses the magnetic powder in an organic solvent, adds silane coupling agent thereto, thereafter promotes a hydrolysis reaction with water, thereby causing the silanol thereof to act on the magnetic particle surfaces, and then effects dehydration polymerization under appropriate heating to cause polymerization on the particle surfaces. However, first, as in the foregoing A), the present invention effects control so that the dispersion obtained by dispersing the magnetic powder in the organic solvent comes to have a degree of dispersion β of 10 or less. Here, the degree of dispersion β means the ratio of Dfloc (particle average volume in solvent by dynamic light scattering) to DTEM (average volume observed by a transmission electron microscope), i.e., Dfloc/DTEM. This value is a ratio representing how large the secondary particles composed of multiple aggregated particles in the liquid are in comparison with the actual primary particles.

The principle of calculating particle volume by dynamic light scattering is as follows. Particles whose diameters are in the range of 1.4 nm-5 μm incessantly change in position, direction and form within a liquid solution owing to linear, rotational and other Brownian movement and when a laser beam is shined on the particles and the emerging scattered light is detected, the velocity of the particle Brownian movement (scatter coefficient) can be determined and the size of the particles can be further ascertained. This measurement principle is used to measure Dfloc. In the Examples set out later, measurement was performed using an LB-500 Dynamic Light Scattering Size Analyser manufactured by Horiba, Ltd.

For determining particle volume using a transmission electron micrograph, a number of micrographs taken at 100,000 or more magnifications were made ready and particle size was measured individually for 400 or more particles therein. For acicular, spindle-shaped, flat acicular and similar particles, the average particle volume was calculated by cylindrical approximation from the measured average major axis length and average minor axis length. The calculation for spherical particles was made from the measured radius. Similar mathematical methods were used for measurements with respect to particles of other shapes.

On the other hand, as in the foregoing B), a magnetic powder containing Al and a rare earth element (R) including Y. has alumina and rare earth element oxide distributed on the particle surfaces, so that the particle surfaces exhibit hydrophilicity throughout. Therefore, a magnetic powder composed primarily of Fe obtained by reducing a precursor material containing Al and R, even if of a particle diameter of 100 nm or less, in some cases less than 80 nm, or even 50 nm or less, assumes a state in an organic solvent that facilitates reaction of the OR group of a silane coupling agent with the whole particle surfaces, while further, if the aforesaid degree of dispersion β is 10 or less and the primary particles are in a state near monodispersion, then when a silane coupling agent is charged therein, OR group of the silane coupling agent reacts with and coats the primary particle surfaces throughout, i.e., the entire surface of the monodispersed individual particles.

The measure and ensuing processing procedure for making the degree of dispersion β of the mixed liquid of the organic medium and the magnetic powder before addition of the silane coupling agent 10 or less is preferably according to the following:

(1) Method of charging the magnetic powder into the organic medium shut off from oxygen, conducting dispersion using a sand grinder (wet attritor) as the dispersion means, thereafter charging the silane coupling agent therein, adding pure water to produce a continuing hydrolysis reaction, further maintaining stirring, filtering the result, and conducting drying after washing with water.
(2) Method of using a wet jet mill (ultimizer: type that disperses by applying a high pressure to the slurry to produce collisions therein) as the dispersion means instead of the sand grinder of the foregoing (1).
(3) Method of using a high-speed agitation type homogenizer as the dispersion means instead of the sand grinder of the foregoing (1).
(4) Method of using ultrasonic means (ultrasonic vat, ultrasonic homogenizer or the like) as the dispersion means instead of the sand grinder of the foregoing (1).
(5) Method of combining two or more of the foregoing (1) to (4).

Although the foregoing dispersion measures (1) to (4) can be adopted in the present invention, the essential point is to enable a degree of dispersion β of 10 or less prior to charging of the silane coupling agent. As the dispersion means of (4), the Ultra-fine Wet Grinding/Dispersion Mill manufactured by Kotobuki Industries Co., Ltd., which is compatible with 0.05-0.1 mm beads, is suitable.

The silane coupling agent used in the present invention can be represented by the following general formula:

where R' represents vinyl group, epoxy group, styryl group, methacryl group, amino group, mercapto group, chloropropyl group or other such organic functional group and OR represents hydrolytic alkoxy group or alkyl group bonded to Si. The action of the silane coupling agent is capable of strongly bonding the hydrophilic magnetic particle surfaces and the OR side, bonding the organic functional group and the coating material resin, and strongly bonding the magnetic powder—silane coupling agent—resin.

In the present invention, R' can be any of the foregoing but is preferably epoxy group, amino group or methacryl group, more preferably amino group or methacryl group, and most preferably methacryl group, which exhibits the most superior effect. However, a method of use is possible wherein R' is selected in accordance with the type of resin used to form the magnetic layer. The OR group can be any of methoxy group, ethoxy group and the like but is preferably methoxy group. Moreover, for controlling reactivity thereof, a method of use is possible wherein the OR group portion is changed to alkyl group to lower reactivity. The amount of the silane coupling agent can be decided in accordance with the specific surface area (BET value) of the magnetic powder to which it is applied.

As the organic solvent used as a dispersant at the time of surface-processing the magnetic powder with the silane coupling agent can be utilized an alcohol, polyol, ketone or the like. The organic medium used is selected considering compatibility with the coupling agent used. When an alcohol is used, it is possible to use methanol, ethanol, 2-propanol or 1-butanol, among which methanol, ethanol are 2-propanol are preferable. The hydrolysis reaction rate can be controlled by adding to the processing system a small amount of, for example, ammonia, acetic acid or hydrochloric acid, which exhibits a catalytic effect. The period of the dispersion processing, while differing between different dispersion devices, can be set to a condition that makes the degree of dispersion β not greater than a prescribed value. Without selecting an appropriate dispersion device, the desired dispersion state cannot be achieved even over a long period.

The magnetic powder surface-treated with silane coupling agent in such manner, even if composed of ultra-fine particles of a particle diameter of 100 nm or less, in some cases less than 80 nm, or even 50 nm or less, has the individual particle surfaces uniformly coated, whereby 1) binding between individual particles decreases, so that the particles are isolated from one another, and 2) the reactants excellent in reactivity with organic compounds cover the particle surfaces throughout, so that compatibility with a coating material or resin is markedly improved. In other words, since aggregation (linking) of individual magnetic particles decreases owing to 1), the magnetic powder becomes excellent in dispersibility in a magnetic coating material. Further, the fact that the surfaces become hydrophobic owing to 2) makes compatibility with a resin good and also makes reactivity with the resin excellent, so that as an overall result, the dispersion of the magnetic powder in a coating material is greatly improved.

Thus, the magnetic powder according to the present invention is characterized in having a very high TAP density owing to the isolation of the individual particles (monodispersion), being outstandingly good in dispersibility of the magnetic powder in toluene, and being high in amount of resin adsorption.

Specifically, the magnetic powder according to the present invention has a TAP density of 0.7 or higher, preferably 0.8 or higher, more preferably 0.9 or higher. A higher TAP density means that the powder has lower bulk as a powder, i.e., is monodispersed with fewer secondary particles, and is a more tightly packed powder. The dispersion is therefore good when making a coating material. Moreover, the packing (packing rate) when fabricated into a tape also tends to increase with increasing TAP density, which is ideal particularly in a magnetic powder for a high-density recording medium.

The magnetic powder of the present invention has a magnetic powder sedimentation rate of 1 cm/5 hr or less when 3 g of the powder is dispersed in 500 mL of toluene and left to stand. A slower sedimentation rate indicates that the powder has better compatibility with hydrophobic solvents and hydrophobic resins and maintains the dispersed state. In other words, when used to make a coating material at the time of tape-making, it exhibits high blendability and ease of dispersion with respect to a coating material that generally exhibits hydrophobicity. Even if the powder before treatment with silane coupling agent should exhibit a sedimentation rate of 12 cm/5 hr or greater (i.e., even if it is poor in blendability with a hydrophobic solvent), the sedimentation rate becomes 1 cm/5 hr or less owing to the silane coupling agent treatment according to the present invention.

Further, the magnetic powder according to the present invention exhibits a vinyl chloride resin (MR-110) adsorption amount of 0.6 mg/m$^2$ or greater, preferably 0.7 mg/m$^2$ or greater. The urethane resin (UR-8200) adsorption amount exhibited is 1.1 mg/m$^2$, preferably 1.3 mg/m$^2$ or greater. In other words, the surface treatment of the magnetic powder with silane coupling agent makes the surface lipophilic, so that it exhibits a resin adsorption amount of such a high level. Therefore, the magnetic powder blends well with a coating material and disperses excellently therein, and since its adhesiveness to resins is also improved, the coating material strength also becomes high.

The particle volume of the invention magnetic powder calculated from a transmission electron micrograph is 1000-15000 nm, preferably 1000-13000 nm$^3$, more preferably 1000-10000 nm$^3$ or less. On top of the particle volume falling within the foregoing range, the average particle diameter is 20-110 nm, preferably 20-80 nm, more preferably 20-70 nm. In the case of acicular particles (spindle-shaped, flat acicular), the average particle diameter indicates the average major axis length and in the case of spherical particles indicates the diameter thereof. When the particle diameter, and by extension the particle volume, is too small, there exists a lower particle size limit from the viewpoint of decline in magnetic properties caused by superparamagnetism due to thermal fluctuation and of difficulty of dispersion and when, to the contrary, it becomes too large, the particles are incompatible with the purpose of the present invention from the viewpoint of a medium that is low in noise in terms of electromagnetic conversion property.

The magnetic powder of the present invention has a specific surface area by the BET method of 40 m$^2$/g or greater, preferably 50 m$^2$/g or greater, more preferably 60 m$^2$/g or greater. A small specific surface area general means that the particles are large and therefore unsuitable for a medium that is low in noise in terms of electromagnetic conversion property.

Since the magnetic powder of the present invention is surface-processed with silane coupling agent, Si and C contained in the silane coupling agent remain on the particle surfaces. Si content is such that Si/Fe expressed in atomic percent is 0.1-10 at. %, preferably 0.2-7 at. %, more preferably 0.3-5 at. %. When Si content is too high, the polymerization reaction of the coupling agent proceeds too far to degrade dispersibility. C content is such that C/Fe expressed in atomic percent is 0.5-40 at. %, preferably 5-35 at. %, more preferably 10-33 at. %. When C content is too high, the surface coating layer becomes thicker than necessary, which is undesirable because it degrades dispersibility and worsens magnetic powder packing in the coated film, thereby causing noise deterioration.

When Co, rare earth element(s) including Y, and Al are contained as other constituent components, they preferably fall within the following constituent ranges. Co content is such that Co/Fe expressed in atomic percent is 20-50 at. %, preferably 20-45 at. %, more preferably 20-40 at. %; a content within these ranges improves saturation magnetization value and oxidation resistance. Al content is such that Al/Fe expressed in atomic percent is 5-30 at. %, preferably 5-25 at. %, a content within these ranges produces an enhanced shape retention effect. R content is such that R/Fe expressed in atomic percent is 4-20 at. %, preferably 6-15 at. %; a content within these ranges produces an enhanced shape retention effect. Moreover, as pointed out earlier, presence of included R and Al results in distribution of Al$_2$O$_3$ and R oxide on the particle surfaces and these greatly help to improve the reactivity with the OR group of the silane coupling agent during surface treatment using silane coupling agent.

Oxygen in the magnetic powder, which is accounted for by the oxygen in the oxide film formed on the particle surfaces, should be 26% or less based on the whole particle, preferably 23% or less, more preferably 20% or less, most preferably 18% or less. By the present invention, the amount (volume) of the oxide film formed on the particle surfaces can be diminished by the treatment of the particle surfaces with the silane coupling agent, thereby reducing the decline in magnetic properties caused by the formation of the oxide film. Although the increase in the specific surface area with increasing particle refinement increases the proportion of the volume of the oxide file per each particle, the present invention enables reduction of the volumetric ratio of the oxide film (low oxygen content) even when the particles are very fine. This relationship is expressed by Formula 3 below and the oxygen content of the magnetic powder according to the present invention satisfies Formula 3 in its relationship with the particle volume:

$$\text{Oxygen content (wt \%)} \leq -4.2 \times In(V) + 55, \quad \text{Formula 3}$$

where V represents particle volume (nm$^3$) calculated from a transmission electron micrograph.

As a magnetic property, the magnetic powder of the present invention exhibits Hc of 1345 Oe or greater, preferably 1500 Oe or greater, more preferably 1700 Oe or greater, this magnetic property can, owing to the aforesaid improvement of magnetic properties by oxide film reduction, be improved to satisfy the relationship of Formula 1 even when the particles are very fine:

$$Hc \geq 325 \times In(V) - 900 \quad \text{Formula 1}$$

where, Hc represents coercive force (Oe) and V represents particle volume (nm$^3$) calculated from a transmission electron micrograph.

Further, the magnetic powder of this invention has a saturation magnetization value as of less than 140 emu/g, preferably less than 130 emu/g. Since high-sensitivity MR heads and GMR heads are being utilized with recent high recording density compatible magnetic recording media, an unnecessarily high as lowers head performance and increases noise, from which it follows that the minimum as required for reading recorded signals suffices, a point on which the σs of the magnetic powder of the invention meets the requirement.

Δσs (amount of change (%) in saturation magnetization value σs during storage for seven days under constant temperature and humidity at a temperature of 60° C. and relative humidity of 90%) is 20% or less, preferably 12% or less, more preferably 9% or less, and in some cases 7% or less. Since specific surface area and appearance of activity at the surface rises in proportion as the particles are finer, the value of Δas has been large in conventional fine particles, but in accordance with the present invention, weatherability and oxidation resistance are improved in comparison with heretofore, so that the relationship of Formula 2 is satisfied between particle volume and Δas:

$$\Delta\sigma s \leq -7.8 \times ln(V) + 94 \qquad \text{Formula 2}$$

where Δσs is expressed in % and V represents particle volume (nm³) calculated from a transmission electron micrograph.

The magnetic powder according to the present invention has an ignition point of 165° C. or higher, preferably 170° C. or higher, more preferably 180° C. or higher. The magnetic powder of the present invention has a much higher ignition point than conventional magnetic powders because it is formed on the particle surfaces with an oxide barrier layer that restricts invasion of oxygen from the outside.

In addition, the magnetic powder according to the present invention has a ΔBm (amount of change (%) in Bm during storage for seven days under constant temperature and humidity at a temperature of 60° C. and relative humidity of 90%), which is an index of oxidation resistance in the case of tape-making, of 15% or less, preferably 13% or less, more preferably 10% or less, and similarly to the aforesaid Δσs, the relationship of Formula 4 is satisfied between particle volume and ΔBm:

$$\Delta Bm \leq -3.6 \times ln(V) + 40.5, \qquad \text{Formula 4}$$

where ΔBm is expressed in % and V represents particle volume (nm³) calculated from a transmission electron micrograph. As is clear from Formula 2 and Formula 4, Δσs>ΔBm. This indicates that oxidation resistance is maintained despite the individual particles being isolated, because coating by silane coupling agent has been uniformly implemented on the surfaces of the individual particles. In other words, when uniform coat formation as in the present invention is not possible, the particles that become individually isolated at tape-making are oxidized from the portions not formed with coating, so that ΔBm becomes poor.

The Hcx, SFDx and SQx of the magnetic layer (after tape-making) vary depending on particle size, so that if particle volume indicating particle size is used as a variable, Hcx, SFDx and SQx can be expressed by a formula including this variable. One characteristic of the magnetic powder according to the present invention is that the following relationships are satisfied when a tape is fabricated using the magnetic powder under specific conditions which are defined to be those used in the following Examples:

$$Hcx \geq 630 \times ln(V) - 3400 \qquad \text{Formula 5}$$

$$SFDx \leq 0.2 + 506 \times V^{-0.79} \qquad \text{Formula 6}$$

$$SQx \geq 0.065 \times ln(V) + 0.15, \qquad \text{Formula 7}$$

where Hcx (Oe), SFDx and SQx are nondimensional numbers and V represents particle volume (nm³) calculated from a transmission electron micrograph.

The reason why the magnetic powder of the present invention can, as shown by Formulas 5 and 6, achieve high Hc, low SFDx and high SQx when made into a tape is that the individual particles can readily disperse, so that when they are oriented in a magnetic field to make a tape, they exhibit superb orientation.

The present invention will now be explained further with reference to examples; the evaluation of the powder properties and tape properties of the magnetic powder as termed in this specification was done by the following testing methods.

Powder Property Evaluation Methods

Particle size measurement: A number of transmission electron micrographs were taken at 100,000 or more magnifications, the particle sizes of 400 or more of the particles were measured separately for each particle and the average value of the measured sizes was calculated.

Particle volume measurement: The particle volume of acicular, spindle-shaped, flat acicular and similarly shaped particles was calculated by cylindrical approximation from the average major axis length and average minor axis length determined in the particle size measurement. The particle volume of spherical particles was measured from the measured diameter. The particle volume of particles of other shapes were calculated using similar mathematical methods.

Particle shape measurement: The cross-sectional ratio of an acicular particle was assessed by placing the particle on the stage of an electron microscope of 100 thousand or more magnifications, tilting the stage, imaging the same portion of the particle a number of times as it traversed the stage, calculating the minimum minor axis width and maximum minor axis width from the images, defining the cross-sectional ratio of the particle as (minimum minor axis width/maximum minor axis width), and defining a particle whose cross-sectional ratio was greater than 1 to be flat acicular.

TAP density measurement: The magnetic powder was placed in a glass sample cell (5 mm diameter×40 mm height) and the density was measured after 200 taps from a tap height of 10 cm.

Oxygen content: Measured with a LECO nitrogen/oxygen determinator.

Measurement of powder magnetic properties: A VSM was used to conduct measurement in an applied magnetic field of max. 10 kOe.

Measurement of magnetic powder oxidation resistance (Δσs): Percent (%) change in saturated magnetization as over one-week storage at 60° C. and 90% RH in a thermohygrostat was calculated.

Measurement of magnetic powder ignition point: Using TG/DTA instrument, the magnetic powder was heated from room temperature in the atmosphere at 10° C./min and the temperature at which ignition occurred was defined as the ignition point.

Specific Surface Area Measurement: Measured By BET Method.

Measurement of magnetic powder sedimentation rate in toluene: A slurry obtained by mixing 3 g of magnetic powder and 500 mL of toluene was subjected to 2 hours of dispersion treatment by circulation at 500 mL/min in an ultrasonic homogenizer. The dispersion obtained was transferred to a 50 cc test tube and allowed to stand for 5 hours, whereupon the uppermost level of the sediment was measured. In other words, the distance by which the uppermost level of the sediment descended was measured to determine the distance moved over five hours.

Measurement Of Magnetic Powder Resin Adsorption Amount (1) Vinyl chloride resin adsorption amount measurement: 1 g of magnetic powder was added to 16.75 g of a 1% vinyl chloride resin (MR-110) (using a 1:1 mixture of MEK and toluene as solvent), the mixture was blended in a centrifugal ball mill at 450 rpm for 1 hr, and then held at 30° C. for 3 days. Specimen powder was made to settle by centrifuging (4000 rpm), the supernatant was removed, and the solid component recovered. In order to wash the solid component, it was added with solvent (MEK:toluene=1: 1), mixed, and held at 25° C. for 2 days, whereafter the supernatant was removed by centrifuging (4000 rpm) and the solid component was recovered. The solid component was dried and its chlorine to iron intensity ratio (Cl/Fe) was determined using a fluorescent X-ray analysis apparatus. A calibration curve prepared beforehand using a sample containing a known amount of MR-110 was used to calculate the MR-110 adsorption amount per unit weight of the magnetic powder and the value obtained was divided by the specific surface area (BET value) to calculate the adsorption amount per unit specific surface area.

(2) Urethane resin adsorption amount measurement: 2 g of magnetic powder and 4 g of a 2% solution of urethane resin (UR-8200) (using MIBK as solvent) were blended together with 30 g of beads (2 ø) in a centrifugal ball mill at 450 rpm for 1 hr and the result was added with 11 g of the same 2% solution of urethane resin, followed by blending at 450 rpm for 30 min. Specimen powder was thereafter made to settle by centrifuging (4000 rpm, 30 min), 5 g of supernatant was batched off, the supernatant was dried and weighed, the urethane resin (UR-8200) adsorption amount per unit weight of the magnetic powder was calculated, and adsorption amount per unit specific surface area was calculated as the quotient obtained by dividing the obtained value by the BET specific surface area.

Test Methods for Tape Property Evaluation (1) Magnetic coating material preparation Magnetic powder, 0.500 g, was weighed out and placed in a pot (inside diameter: 45 mm, depth: 13 mm) and allowed to stand for 10 min with the cover open. Next, 0.700 mL of a vehicle [mixed solution of vinyl chloride resin MR-110 (22 wt %), cyclohexanone (38.7 wt %), acetylacetone (0.3 wt %), n-butyl stearate (0.3 wt %) and methyl ethyl ketone (MEK, 38.7%)] was added to the pot using a micropipette. A steel ball (2 ø), 30 g, and ten nylon balls (8 ø) were immediately added to the pot and the pot was covered and allowed to stand for 10 min. The pot was then set in a centrifugal ball mill (Fritsch P-6) and gradually raised to a final rotating speed of 600 rpm, at which dispersion was continued for 60 min. The centrifugal ball mill was stopped and the pot removed. Using a micropipette, the pot was added with 1.800 mL of a liquid adjuster prepared in advance by mixing MEK and toluene at a ratio of 1:1. The pot was again set in the centrifugal ball mill and dispersion was conducted at 600 rpm for 5 min. This completed the dispersion.

(2) Magnetic Tape Preparation

Upon completion of the foregoing dispersion, the cover of the pot was opened and the nylon balls removed. The coating material, together with the steel ball, was placed in an applicator (55 µm) and coated onto a support film (15 µm polyethylene film marketed by Toray Industries under the product designation 15C-B500). The coated film was promptly placed at the center of the coil of a 5.5 kG magnetic orientation device, subjected to magnetic field orientation, and then dried.

(3) Tape Property Evaluation

Magnetic property measurement: Coercive forces Hcx, SFDx and SQx of the obtained tape were measured using a VSM.

Tape oxidation resistance ($\Delta$Bm) measurement: Percent (%) change in Bm over one one-week storage at 60° C. and 90% RH in a thermohygrostat was calculated.

Tape surface smoothness (surface roughness Ra) measurement: Ra (roughness) of the tape surface was measured using a three-dimensional fine shape measuring machine (model ET-30HK) manufactured by Kabushiki Kaisha Kosaka Laboratory.

EXAMPLES

Example 1

2-Propanol, 679 g, was placed in a 1-liter beaker having a tightly sealable cover and nitrogen was blown into the liquid (at 1 liter/min) under stirring to purge it of dissolved oxygen and lower the oxygen concentration of the vapor in the upper space of the beaker to 0.1% or lower. The blowing in of nitrogen and stirring were continued until the reaction was completed.

Six grams of magnetic powder A having the properties shown in Table 1 was charged into the beaker without being brought into contact with air. Following 10 min of stirring, a dispersion treatment in which circulation consisting of continuously drawing part of the liquid out of the beaker, leading it to a circulating sand grinder and then returning it to the beaker was continued for 60 min. In preparation for the treatment, the sand grinder was charged with fine zirconium beads of 0.1 µm diameter at a charging rate of 85% and the stirring in the beaker was continued at a high speed of 2000 rpm.

Part of the liquid after dispersion treatment was batched off and the average volume of particles in the solvent was measured by the dynamic light scattering method. On the other hand, as soon as the batch-off was finished, the remainder of the dispersion was charged with 3 wt % concentration coupling agent ($\gamma$-methacryloxy propyltrimethoxy silane) in the amount required to make Si/Fe of the magnetic powder 2 at. % and the dispersion treatment was continued in the foregoing manner for 60 min, whereafter 6.3 g of pure water was charged to conduct ripening with concurrent hydrolysis reaction for 120 min. The foregoing dispersion treatment by stirring and liquid circulation was also continued during this hydrolysis and ripening.

Following this treatment, the dispersion obtained was filtered off using a Teflon (trade mark) membrane filter and washed with 2-propanol. The obtained wet magnetic powder was granulized and thoroughly dried at 100° C. for 8 hr. The treatment was also conducted in a nitrogen atmosphere from filtering through drying. The obtained magnetic powder was evaluated for powder properties and tape properties. The results are shown in Tables 1 and 2.

Example 2

Example 1 was repeated except that magnetic powder B of the properties shown in Table 1 was used instead of the magnetic powder A and a liquid-circulation ultrasonic homogenizer was used for the dispersion treatment in place of the liquid-circulation sand grinder. The obtained magnetic powder was evaluated for powder properties and tape properties. The results are shown in Tables 1 and 2.

Example 3

Example 1 was repeated except that magnetic powder C of the properties shown in Table 1 was used instead of the magnetic powder A and the period of the dispersion by circulation through the sand grinder was extended from 60 min to 420 min. The obtained magnetic powder was evaluated for powder properties and tape properties. The results are shown in Tables 1 and 2.

Example 4

Example 1 was repeated except that a wet jet mill (ultimizer) was used in place of the sand grinder. The obtained magnetic powder was evaluated for powder properties and tape properties. The results are shown in Tables 1 and 2.

Comparative Example 1

Example 1 was repeated except that a planetary ball mill was used in place of the sand grinder. The obtained magnetic powder was evaluated for powder properties and tape properties. The results are shown in Tables 1 and 2.

Comparative Example 2

Example 1 was repeated except that a rotary agitator with turbine blades was used in place of the sand grinder. The obtained magnetic powder was evaluated for powder properties and tape properties. The results are shown in Tables 1 and 2.

Example 5

Example 1 was repeated except that the period of the dispersion by circulation through the sand grinder was extended from 60 min to 420 min. The obtained magnetic powder was evaluated for powder properties and tape properties. The results are shown in Tables 1 and 2.

Comparative Example 3

Example 1 was repeated except that the period of the dispersion by circulation through the sand grinder was shortened from 60 min to 20 min. The obtained magnetic powder was evaluated for powder properties and tape properties. The results are shown in Tables 1 and 2.

Example 6

Example 1 was repeated except that the amount of silane coupling agent added was changed from the amount required to make Si/Fe of the magnetic powder 2 at. % to the amount required to make Si/Fe of the magnetic powder 1 at. %. The obtained magnetic powder was evaluated for powder properties and tape properties. The results are shown in Tables 1 and 2.

Example 7

Example 1 was repeated except that the amount of silane coupling agent added was changed from the amount required to make Si/Fe of the magnetic powder 2 at. % to the amount required to make Si/Fe of the magnetic powder 5 at. %. The obtained magnetic powder was evaluated for powder properties and tape properties. The results are shown in Tables 1 and 2.

Example 8

Example 1 was repeated except that the silane coupling agent was changed from γ-methacryloxy propyltrimethoxy silane to γ-amino propyltriethoxy silane. The obtained magnetic powder was evaluated for powder properties and tape properties. The results are shown in Tables 1 and 2.

Example 9

Example 1 was repeated except that the silane coupling agent was changed from γ-methacryloxy propyltrimethoxy silane to γ-glycidoxy propyltrimethoxy silane. The obtained magnetic powder was evaluated for powder properties and tape properties. The results are shown in Tables 1 and 2.

Comparative Examnple 4

The magnetic powder A was subjected to an oxidation reaction for 100 min at 120° C. in nitrogen gas having an oxygen concentration of 1000 ppm to grow an oxide film on the surfaces of the individual particles of the magnetic powder A. The obtained magnetic powder was evaluated for powder properties and tape properties. The results are shown in Tables 1 and 2.

Comparative Example 5

The magnetic powder B was subjected to an oxidation reaction for 100 min at 120° C. in nitrogen gas having an oxygen concentration of 1000 ppm to grow an oxide film on the surfaces of the individual particles of the magnetic powder B. The obtained magnetic powder was evaluated for powder properties and tape properties. The results are shown in Tables 1 and 2.

Example 10

Example 1 was repeated except that spindle-shaped magnetic powder D of the properties shown in Table 1 was used instead of the magnetic powder A. The obtained magnetic powder was evaluated for powder properties and tape properties. The results are shown in Tables 1 and 2.

Comparative Example 6

Example 1 was. repeated except that low R content magnetic powder E of the properties shown in Table 1 was used instead of the magnetic powder A. The obtained magnetic powder was evaluated for powder properties and tape properties. The results are shown in Tables 1 and 2.

TABLE 1

| | | | Detailed conditions | | | | | Powder properties | | |
| --- | --- | --- | --- | --- | --- | --- | --- | --- | --- | --- |
| | Magnetic powder | Silane coupling agentType | Amount (Si/Fe + Co) at. % | Disperse method | Disperse time (Min) | Disperse time after hydrolysis (Min) | Disperse degree | Particle shape | Diameter nm | Particle vol mm3 |
| Powder A | A | — | — | — | — | — | — | Flatacicular | 61 | 6800 |
| C. Exmp 4 | A | — | — | — | — | — | — | Flatacicular | 62 | 7100 |
| Exmp 1 | A | I | 2 | Sand grinder | 60 | 120 | 4 | Flatacicular | 62 | 6900 |

TABLE 1-continued

| | | | | | | | | | | | |
|---|---|---|---|---|---|---|---|---|---|---|---|
| Powder B | | B | — | — | — | — | — | — | Flatacicular | 48 | 4300 |
| C. Exmp | 5 | B | — | — | — | — | — | — | Flatacicular | 49 | 4500 |
| Exmp | 2 | B | I | 2 | Ultrasonic homogenizer | 60 | 120 | 4 | Flatacicular | 50 | 4400 |
| Powder C | | C | — | — | — | — | — | — | Flatacicular | 32 | 2400 |
| Exmp | 3 | C | I | 2 | Sand grinder | 420 | 120 | 6 | Flatacicular | 33 | 2600 |
| Exmp | 4 | A | I | 2 | Ultimizer | 60 | 120 | 2 | Flatacicular | 62 | 6900 |
| C. Exmp | 1 | A | I | 2 | Planetary ball mill | 60 | 120 | 17 | Flatacicular | 62 | 6900 |
| C. Exmp | 2 | A | I | 2 | Rotary agitator | 60 | 120 | 20 | Flatacicular | 62 | 6900 |
| Exmp | 5 | A | I | 2 | Sand grinder | 420 | 120 | 3 | Flatacicular | 62 | 6900 |
| C. Exmp | 3 | A | I | 2 | Sand grinder | 20 | 120 | 16 | Flatacicular | 62 | 6900 |
| Exmp | 6 | A | I | 1 | Sand grinder | 60 | 120 | 4 | Flatacicular | 61 | 6800 |
| Exmp | 7 | A | I | 5 | Sand grinder | 60 | 120 | 4 | Flatacicular | 62 | 6900 |
| Exmp | 8 | A | II | 2 | Sand grinder | 60 | 120 | 4 | Flatacicular | 62 | 6900 |
| Exmp | 9 | A | III | 2 | Sand grinder | 60 | 120 | 4 | Flatacicular | 62 | 6900 |
| Powder D | | D | — | — | — | — | — | — | Spindle | 62 | 6900 |
| Exmp | 10 | D | I | 2 | Sand grinder | 60 | 120 | 4 | Spindle | 62 | 6900 |
| Pwdr E | | E | — | — | — | — | — | — | Spindle | 60 | 6800 |
| C. Exmp | 6 | E | I | 2 | Sand grinder | 60 | 120 | 5 | Spindle | 60 | 6900 |

| | | Powder properties | | | | | | | | | |
|---|---|---|---|---|---|---|---|---|---|---|---|
| | | Composition | | | | | | Bulk properties | | | TAP |
| | | O wt % | Co/Fe at. % | Al/Fe at. % | Y/Fe at. % | Si/Fe at. % | C//Fe at. % | BET m2/g | Dx Å | Hc Oe | os emu/g | density g/cc |
| Powder A | | 15.0 | 24.1 | 11.6 | 9.6 | <0.1 | 0.2 | 66 | 134 | 2482 | 125 | 0.56 |
| C. Exmp | 4 | 17.0 | 23.2 | 11.8 | 9.7 | <0.1 | 0.3 | 67 | 128 | 2450 | 105 | 0.60 |
| Exmp | 1 | 13.5 | 23.0 | 11.3 | 9.6 | 1.5 | 16.2 | 62 | 131 | 2289 | 122 | 1.09 |
| Powder B | | 16.0 | 24.0 | 11.9 | 9.7 | <0.1 | 0.3 | 73 | 126 | 2214 | 118 | 0.56 |
| C. Exmp | 5 | 19.0 | 23.2 | 11.7 | 10.0 | <0.1 | 0.3 | 73 | 121 | 2150 | 97 | — |
| Exmp | 2 | 15.0 | 23.4 | 11.3 | 9.7 | 2.6 | 18.1 | 67 | 122 | 2046 | 115 | 1.08 |
| Powder C | | 20.0 | 22.3 | 25.2 | 15.2 | <0.1 | 0.7 | 106 | 102 | 1831 | 89 | 0.47 |
| Exmp | 3 | 19.5 | 23.7 | 26.0 | 16.1 | 4.6 | 28.5 | 89 | 101 | 1789 | 85 | 0.79 |
| Exmp | 4 | 13.4 | 22.9 | 11.4 | 9.3 | 1.5 | 16.1 | 63 | 131 | 2345 | 122 | 1.02 |
| C. Exmp | 1 | 13.6 | 23.1 | 11.2 | 9.5 | 1.5 | 16.4 | 63 | 132 | 2272 | 121 | 1.09 |
| C. Exmp | 2 | 13.1 | 23.1 | 11.3 | 9.6 | 1.4 | 15.6 | 62 | 130 | 2190 | 121 | 1.10 |
| Exmp | 5 | 13.0 | 23.1 | 11.4 | 9.6 | 1.6 | 15.7 | 61 | 132 | 2270 | 122 | 1.00 |
| C. Exmp | 3 | 13.5 | 23.2 | 11.3 | 9.5 | 1.5 | 15.5 | 61 | 133 | 2290 | 122 | 1.11 |
| Exmp | 6 | 13.2 | 22.8 | 11.2 | 9.5 | 0.9 | 16.1 | 64 | 131 | 2342 | 123 | 1.08 |
| Exmp | 7 | 12.9 | 23.2 | 11.2 | 9.7 | 4.4 | 16.7 | 58 | 132 | 2165 | 120 | 1.13 |
| Exmp | 8 | 13.8 | 23.0 | 11.3 | 9.8 | 1.5 | 15.8 | 62 | 132 | 2310 | 122 | 1.11 |
| Exmp | 9 | 13.2 | 23.2 | 11.4 | 9.5 | 1.4 | 15.6 | 61 | 130 | 2361 | 121 | 1.09 |
| Powder D | | 14.1 | 23.3 | 11.4 | 9.4 | <0.1 | 0.2 | 61 | 138 | 2412 | 127 | 0.54 |
| Exmp | 10 | 13.5 | 23.4 | 11.4 | 9.5 | 1.3 | 15.9 | 59 | 135 | 2245 | 124 | 1.09 |
| Pwdr E | | 15.2 | 24.1 | 11.6 | 3.2 | <0.1 | 0.2 | 56 | 141 | 1930 | 138 | 0.52 |
| C. Exmp | 6 | 14.6 | 23.0 | 11.3 | 3.3 | 1.7 | 16.4 | 58 | 139 | 1870 | 136 | 0.69 |

I: γ-methacryloxy propyltrimethoxy silane
II: γ-amino propyltriethoxy silane
III: γ-glycidoxy propyltrimethoxy silane

TABLE 2

| | | Powder properties | | | | | Tape properties | | | | | |
|---|---|---|---|---|---|---|---|---|---|---|---|---|
| | | Sedimentation rate cm/5 h | Adsorption properties | | Wetherability | | | Tape magnetic properties | | | | Surface roughness | Wetherability |
| | | | Vinyl chloride resin mg/m2 | Urethane resin mg/m2 | Δos % | Ignition point °C. | | Hcx Oe | SFDx | SQx | OR | Ra nm | ΔBm % |
| Powder A | | 14.0 | 0.4 | 0.9 | 19.2 | 132.7 | | 2645 | 0.40 | 0.80 | 1.8 | 8.4 | 8.9 |
| C. Exmp | 4 | 14.0 | 0.4 | 0.9 | 9.5 | 163.2 | | 2624 | 0.60 | 0.73 | 1.6 | 9.3 | 5.4 |
| Exmp | 1 | 0.3 | 0.7 | 1.5 | 9.2 | 187.2 | | 2787 | 0.26 | 0.91 | 3.0 | 4.3 | 5.0 |
| Powder B | | 14.0 | 0.4 | 0.8 | 22.6 | 133.7 | | 2570 | 0.52 | 0.85 | 2.2 | 9.2 | 9.7 |
| C. Exmp | 5 | 14.0 | 0.4 | 0.8 | 9.0 | 160.2 | | 2621 | 0.68 | 0.86 | 2.4 | 9.5 | 5.4 |
| Exmp | 2 | 0.3 | 0.7 | 1.3 | 8.9 | 186.3 | | 2724 | 0.47 | 0.89 | 2.8 | 4.9 | 5.1 |
| Powder C | | 14.0 | 0.4 | 0.8 | 21.0 | 124.1 | | 2276 | 0.88 | 0.81 | 2.2 | 11.3 | 11.8 |
| Exmp | 3 | 0.4 | 0.7 | 1.2 | 11.8 | 169.9 | | 2389 | 0.86 | 0.85 | 2.5 | 5.7 | 8.6 |
| Exmp | 4 | 0.1 | 0.9 | 1.7 | 3.1 | 198.2 | | 3043 | 0.22 | 0.93 | 3.4 | 3.2 | 1.7 |
| C. Exmp | 1 | 2.6 | 0.6 | 1.0 | 16.0 | 142.0 | | 2769 | 0.34 | 0.87 | 2.5 | 7.8 | 8.2 |
| C. Exmp | 2 | 4.2 | 0.5 | 1.0 | 18.0 | 135.0 | | 2756 | 0.36 | 0.87 | 2.4 | 8.0 | 9.1 |

TABLE 2-continued

| | | Powder properties | | | | | Tape properties | | | | | |
|---|---|---|---|---|---|---|---|---|---|---|---|---|
| | | Sedimen- | Adsorption properties | | Wetherability | | | | | | Surface | |
| | | tation | Vinyl chloride | Urethane | | Ignition | Tape magnetic properties | | | | roughness | Wetherability |
| | | rate cm/5 h | resin mg/m2 | resin mg/m2 | $\Delta\sigma s$ % | point ° C. | Hcx Oe | SFDx | SQx | OR | Ra nm | $\Delta$Bm % |
| Exmp | 5 | 0.3 | 0.9 | 1.7 | 6.1 | 191.3 | 2830 | 0.24 | 0.92 | 3.2 | 4.8 | 3.4 |
| C. Exmp | 3 | 3.8 | 0.5 | 1.0 | 17.0 | 141.0 | 2806 | 0.34 | 0.88 | 2.5 | 7.4 | 8.8 |
| Exmp | 6 | — | — | — | 9.8 | 181.0 | 2911 | 0.32 | 0.91 | 3.0 | 4.4 | 6.8 |
| Exmp | 7 | — | — | — | 9.7 | 175.4 | 2814 | 0.32 | 0.82 | 2.2 | 6.3 | 7.4 |
| Exmp | 8 | — | — | — | 11.4 | 171.2 | 2918 | 0.31 | 0.91 | 3.1 | 6.9 | 9.3 |
| Exmp | 9 | — | — | — | 12.3 | 174.0 | 2792 | 0.33 | 0.88 | 2.7 | 7.4 | 8.2 |
| Powder D | | 14.0 | — | — | 20.1 | 135.3 | 2531 | 0.45 | 0.80 | 1.9 | 10.3 | 9.7 |
| Exmp | 10 | 0.4 | — | — | 9.6 | 184.0 | 2690 | 0.31 | 0.89 | 2.9 | 6.6 | 6.4 |
| Powder E | | 14.0 | — | — | 18.0 | 131.0 | 2111 | 0.70 | 0.75 | 1.6 | 12.0 | 10.7 |
| C. Exmp | 6 | 7.0 | — | — | 14.0 | 163.1 | 2194 | 0.66 | 0.78 | 1.9 | 9.0 | 11.1 |

The following can be seen from Tables 1 and 2.

A) When silane coupling agent treatment was performed, TAP density improved to 0.7 or greater and the powder assumed a substantially monodispersed state even when the particle diameter was 70 nm or less.

B) Although a tendency for dispersion to become more difficult with increasingly finer particles of smaller particle diameter and smaller particle volume was observed, silane coupling agent treatment under condition of a degree of dispersion β of 10 or less enabled production of a magnetic powder of excellent dispersibility exhibiting a tape orientation (OR) of 2.5 or greater even in the case of fine particles of 70 nm or less.

C) When silane coupling agent treatment was performed under condition of degree of dispersion βσs≦10, tape Hcx, SFDx and OR improved and surface smoothness Ra improved. Further, as regards the oxidation resistance of the magnetic powder, a marked improved was observed in that Δσs and ΔBm decreased and, in addition, the ignition point rose.

D) Although the magnetic powders of Comparative Examples 4 and 5 were improved in oxidation resistance by making the thickness of the surface oxide coating great, the Examples of the present invention exhibiting oxidation resistance of a Δσs of the same or higher level exhibited excellent characteristics in terms of tape Hc, SFD and SQx and were high in ignition point, thus simultaneously achieving improvement of both oxidation resistance and tape properties.

As explained in the foregoing, the present invention provides a ferromagnetic powder that, even when composed of fine particles of a particle diameter of 100 nm or less, optionally 70 nm or less, nevertheless is high in TAP density (TAP density≧0.7 g/cm$^3$) and excellent in weatherability, and is further excellent in orientation when used in a tape, thereby enabling provision of a magnetic recording medium that is excellent in storage safety as a high-density magnetic recording medium and excellent in electromagnetic conversion property.

The invention claimed is:

1. A magnetic powder composed primarily of Fe that has been surface-treated with a silane coupling agent, which magnetic powder is made up of acicular particles and is characterized in that:

it contains
  Co such that Co/Fe expressed in atomic percent is 20-50 at. %,
  Al such that Al/Fe expressed in atomic percent is 5-30 at. %, and
  one or more rare earth elements R (including Y) such that R/Fe expressed in atomic percent is 4-20 at. %,
and has
  average particle diameter of smaller than 80 nm,
  TAP density of 0.7 g/cm$^3$ or greater,
  ignition point of 165° C. or higher,
  oxygen content of 26 wt % or less, and
satisfies the relation of Formula 1 below between its coercive force and particle volume:

$$Hc \geq 325 \times In(V) - 900, \quad \text{Formula 1}$$

where, in Formula 1, Hc represents coercive force (Oe) and V represents particle volume (nm$^3$) calculated from a transmission electron micrograph.

2. A magnetic powder according to claim 1, wherein the shape of the particles is flat acicular.

3. A magnetic powder according to claim 1, whose magnetic powder sedimentation rate is 1 cm/5 hr or less when 3 g of the powder is dispersed in 500 mL of toluene and left to stand.

4. A magnetic powder according to claim 1, whose vinyl chloride (MR-110) adsorption amount is 0.6 mg/m$^2$ or greater and whose urethane (UR-8200) adsorption amount is 1.1 mg/m$^2$ or greater.

5. A magnetic powder according to claim 1, whose tape ΔBm (amount of change (%) in Bm during storage for seven days under constant temperature and humidity at a temperature of 60° C. and relative humidity of 90%) is 15% or less as per a test method for evaluating tape properties.

6. A magnetic powder according to claim 5, which satisfies the relationship of Formula 4 between ΔBm and particle volume (V) of the magnetic powder:

$$\Delta Bm \leq -3.6 \times In(V) + 40.5. \quad \text{Formula 4}$$

7. A magnetic powder according to claim 1, which, as per a test method for evaluating tape properties, satisfies:
  the relationship of Formula 5 between tape Hcx and particle volume (V) of the magnetic powder,
  the relationship of Formula 6 between tape SFDx and particle volume (V) of the magnetic powder, and the relationship of Formula 7 between tape SQx and particle volume (V) of the magnetic powder:

$$Hcx \geq 630 \times In(V) - 3400 \quad \text{Formula 5}$$

$$SFDx \leq 0.2 + 506 V^{-0.79} \quad \text{Formula 6}$$

$$SQx \geq 0.065 \times In(V) + 0.15. \quad \text{Formula 7}$$

8. A coating-type magnetic recording medium having a magnetic layer obtained by dispersing the magnetic powder of claim 1 in a resin at an orientation ratio of 2.5 or greater.

9. A coating-type magnetic recording medium according to claim 8, whose magnetic layer exhibits ΔBm (amount of change (%) in Bm during storage for seven days under constant temperature and humidity at a temperature of 60° C. and relative humidity of 90%) of 15% or less.

10. A coating magnetic recording medium according to claim 8, which satisfies the relationship of Formula 4 between ΔBm and particle volume (V) of the magnetic powder:

$$\Delta Bm \leq -3.6 \times In(V) + 40.5. \quad \text{Formula 4}$$

11. A coating magnetic recording medium according to claim 8, which satisfies:

the relationship of Formula 5 between tape Hcx and particle volume (V) of the magnetic layer, the relationship of Formula 6 between tape SFDx and particle volume (V) of the magnetic layer, and the relationship of Formula 7 between tape SQx and particle volume (V) of the magnetic layer:

$$Hcx \geq 630 \times In(V) - 3400 \quad \text{Formula 5}$$

$$SFDx \leq 0.2 + 506 \times V^{-0.79} \quad \text{Formula 6}$$

$$SQx \geq 0.065 \times In(V) + 0.15. \quad \text{Formula 7}$$

12. A magnetic powder composed primarily of Fe, which is a magnetic powder that is made up of acicular particles and is for a coating-type magnetic recording medium that:
has
a particle volume (V) calculated from a transmission electron micrograph of not less than 1000 nm³ and not greater than 15000 nm³,
contains
Si such that Si/Fe expressed in atomic percent is 0.1-10 at. %, and
C such that C/Fe expressed in atomic percent is 0.5-40 at. %,
and has
oxygen content of 26 wt % or less
TAP density of 0.7 g/cm³ or greater,
ignition point of 165° C. or higher,
Δσs (amount of change (%) in saturation magnetization value as during storage for seven days under constant temperature and humidity at a temperature of 60° C. and relative humidity of 90%) of 20% or less, and
saturation magnetization value as of less than 140 emu/g,
and satisfies
the relation of Formula 1 below between its coercive force and particle volume:

$$Hc \geq 325 \times In(V) - 900, \quad \text{Formula 1}$$

where, in Formula 1, Hc represents coercive force (Oe) and V represents particle volume (nm³) calculated from a transmission electron micrograph.

13. A magnetic powder according to claim 12, which satisfies the relationship of Formula 2 between its Δσ and particle volume (V) and satisfies the relationship of Formula 3 between its oxygen content and particle volume (V):

$$\Delta \sigma s \leq -7.8 \times In(V) + 94, \quad \text{Formula 2}$$

$$\text{Oxygen content} \leq -4.2 \times In(V) + 55. \quad \text{Formula 3}$$

14. A magnetic powder according to claim 12, which is composed of acicular iron alloy magnetic particles whose:
specific surface area by BET method is 60 m²/g or greater,
average major axis length is 20-80 nm,
Co content is such that Co/Fe expressed in atomic percent is 20-50 at. %,
Al content is such that Al/Fe expressed in atomic percent is 5-30 at. %, and
rare earth element R content including Y is such that R/Fe expressed in atomic percent is 4-20 at. %.

15. A method of surface treating a magnetic powder according to claim 2 and characterized in that, in surface treating particle surfaces of a magnetic powder composed primarily of iron with a silane coupling agent, the magnetic powder and the silane coupling agent are reacted in an organic medium under a nonoxidizing atmosphere and in a state of dispersion up to where the degree of dispersion β according to the formula below becomes 10 or less:

Degree of dispersion β=Dfloc (particle average volume in solvent by dynamic light scattering)/DTEM (particle average volume observed by a transmission electron microscope).

16. A surface treating method according to claim 15, wherein the magnetic powder is composed of particles on whose surfaces is distributed hydrophilic alumina or oxide of rare earth element(s) including Y.

* * * * *